United States Patent [19]

Velius

[11] Patent Number: 5,014,303

[45] Date of Patent: May 7, 1991

[54] OPERATOR SERVICES USING SPEECH PROCESSING

[75] Inventor: George A. Velius, Township of Morris, N.J.

[73] Assignee: Bell Communications Research, Inc., Livingston, N.J.

[21] Appl. No.: 452,567

[22] Filed: Dec. 18, 1989

[51] Int. Cl.[5] .............................................. H04M 3/42
[52] U.S. Cl. .................................... 379/201; 379/265; 379/266
[58] Field of Search ............... 379/265, 266, 308, 309, 379/223, 201, 213, 214, 88, 67

[56] References Cited

U.S. PATENT DOCUMENTS

| | | | |
|---|---|---|---|
| 4,696,039 | 9/1987 | Doddington | 379/88 X |
| 4,790,003 | 12/1988 | Kopley et al. | 379/88 |
| 4,881,261 | 11/1989 | Oliphant et al. | 374/309 X |
| 4,896,345 | 1/1990 | Thorne | 379/266 X |

*Primary Examiner*—James L. Dwyer
*Attorney, Agent, or Firm*—James W. Falk; Leonard Charles Suchyta

[57] ABSTRACT

Speech compression technology is utilized to reduce the average working time of an operator on directory assistance calls. In particular, a directory assistance call arriving at an automatic call distributor via a directory assistance trunk is first processed by a speech processing system to compress the initial request for a telephone number. The speech processing system is then connected to an operator position to transmit the processed initial order thereto.

11 Claims, 7 Drawing Sheets

OPERATOR SERVICES USING SPEECH PROCESSING

FIELD OF THE INVENTION

The present invention relates to a method and apparatus for using speech processing technology in connection with directory assistance or other service calls handled by a pool of operators. As is shown below, the use of speech processing technology significantly reduces the average working time of an operator on a directory assistance call.

BACKGROUND OF THE INVENTION

Presently, a directly assistance call is initiated when a telephone subscriber dials a predetermined telephone number such as 411 or 555-1212. The directory assistance call is routed by the public telephone network to a special switch known as an automatic call distributor or ACD. One commonly used type of ACD is known as the No.5 crossbar ACD.

On an incoming side, the ACD is connected to a plurality of directory assistance trunks. On an outgoing side, the ACD is connected to a plurality of operator positions. The ACD serves to connect a directory assistance call arriving on one of the directory assistance trunks to the first available operator position. If no operator position is available for an incoming directory assistance call when it arrives, the ACD queues the call and transmits appropriate signals back through the telephone network so that the subscriber who made the directory assistance call hears ringing. When an operator position becomes available, the ACD connects the directory assistance call which has been queued the longest to the available operator position.

When a directory assistance call is connected by an ACD to an operator position, the operator at that position hears a beep tone indicating a directory assistance call has been connected to that position. Then, either the operator says a greeting or a recording device, with a greeting prerecorded by the operator, automatically plays a greeting to the subscriber while the operator is listening. The subscriber then provides information about a requested telephone listing. Based on this information the operator uses a keyboard to query a directory assistance data base to obtain the requested telephone number. If necessary, during this process, the operator asks the subscriber for more information. Once the requested telephone number is identified by the operator, it is presented verbally to the subscriber. Currently, in most locations, this spoken information is usually generated by an automated voice system without the operator being on line.

Between the time a directory assistance call arrives at an ACD and the time when the customer finishes speaking the initial directory assistance request, there are several distinct intervals. These intervals are:

(1) a queuing interval, during which the call waits at the ACD for an available operator position. It is during this queuing delay that ringing is heard by the customer. This interval ranges from less than 0.5 second to over 10.0 seconds. During periods of high traffic volumes when team sizes are large, the average queuing interval is typically about 2.0 seconds. During periods of low traffic volumes when team sizes are small, such as early morning, late evening and nights, the average queuing delay is typically about 6.0 seconds.

(2) a greeting interval, during which the operator says a greeting or a greeting is played by a recording device at the operator's position. This interval typically lasts about 1.0 seconds, and (2) a request interval, wherein the subscriber speaks the initial directory assistance request and the operator hears the initial request, i.e., "Ahhh, yes. In Morristown, the number for the City Hall." This interval typically ranges between 2.0 and 8.0 seconds, and averages around 4.0 seconds.

Based on the averages described above, the average time consumed by the sum of the queuing interval, the greeting interval and the request interval averages about 7.0 seconds during busy periods of the day when large teams of operators are used, and 11.0 seconds during periods of lighter traffic volumes when small teams of operators are used. The difference is due to the longer queuing delays encountered during periods of smaller team size. The customer is involved in the call during this entire period.

On the other hand, the operator only participates during the greeting interval and the request interval, not during the period of queuing delay. Thus, the average working time of the operator for the above-described portion of a directory assistance call typically ranges from 3.0 to 9.0 seconds, and typically averages about 5.0 seconds (1.0 second for the greeting interval and 4.0 seconds for the initial directory assistance request).

Speech compression is a method for processing speech so that a listener can hear it in less time than the speaker took to say it. This compression can be accomplished without changing the pitch of the speaker's voice. Speech processing systems which can compress speech are available, for example, from the DSP Group, Inc., Emeryville, Calif.

Illustratively, to compress speech, a processing system analyzes the spectral content of a speech signal and detects the speed at which this spectral information changes. The speech processing system utilizes this information to determine the degree to which the speech signal can be compressed. Compression involves removing bits of redundant information. Alternatively, or in conjunction with speech compression, other speech processing techniques such as silence deletion, automatic speech recognition, etc. may be implemented to reduce the time required to hear subscriber's speech.

In a directory assistance call, for example, if a subscriber responds to the initial greeting "Ahhhh, yes. In Morristown, the number for the City Hall," the speech processing system recognizes that the "Ahhhh" is essentially a long constant vowel, where a substantial portion can be removed so that what remains sounds like "Ah." Using this approach, the speech signal of a slow talker is speeded up relatively more than that of a fast talker.

It is an object of the present invention to apply speech compression technology to the above-described directory assistance calls to significantly reduce the average working time of an operator for a directory assistance call.

SUMMARY OF THE INVENTION

In an illustrative embodiment of the invention, when a directory assistance call reaches an ACD, the ACD connects the call to one of a plurality of speech processing system which are associated with the ACD. The specific speech processing system plays a generic greeting to the subscriber which initiated the directory assistance call.

In response to the generic greeting, the subscriber speaks the initial directory assistance request. As the customer speaks the initial request, the speech is received and compressed by the speech processing system. The compressed directory assistance request is stored in a memory buffer.

Meanwhile, at a predetermined time after the directory assistance call is connected to the speech processing system, the speech processing system places a bid via the ACD for an available operator position. If no operator position is available, the bid is queued by the ACD until an operator position becomes available.

When an operator position becomes available, the speech processing system is connected to the operator position and the operator begins hearing the initial request. The operator does not hear the generic greeting. Furthermore, the operator does not provide a personal greeting or listen to a recording of a personal greeting.

If the subscriber is still speaking when the speech processing system is connected to the operator, this speech is also compressed and transmitted to the operator in compressed form. The customer speaks to the input part of the speech processing system; the operator listens to the compressed output of the speech processing system until the memory buffer in the speech processing system is emptied, at which time the operator is connected directly to the customer. Further speech by the customer is heard simultaneously in real time by the operator, as the customer speaks.

Based on the customer's request information, the operator uses the position keyboard to query the directory assistance data base to obtain the desired telephone listing. Once the operator selects a listing, the operator depresses a key to connect the customer to a device which uses prerecorded numbers to "speak" the requested telephone number to the subscriber.

In accordance with an example of the invention, between the time a directory assistance call arrives at the ACD and the time the customer finishes speaking the initial directory assistance request, there are several distinct intervals. These intervals are:

(1) a greeting interval, during which the speech processing system plays a generic greeting for the subscriber. Based on the greeting phrases used today, this interval lasts on the order of 1.0. (However, if this invention were in use, the operator would not yet be on the call while the generic greeting was being played for the customer. Therefore, since lengthening the greeting would not increase operator work time, some users may choose to increase the length of this greeting to 3.0 seconds or more in order to impart more information to customers.)

(2) a request interval, wherein the subscriber speaks the initial directory assistance request, i.e., "Ahhh, yes. In Morristown, the number for the City Hall." This interval typically ranges between 2.0 and 8.0 seconds, and typically average about 4.0 seconds.

(3) a queuing interval, which starts simultaneously with or immediately after the start of the greeting interval and wherein the request of the speech processing system for an operator position is queued. The queuing interval typically ranges from less than 0.5 seconds to more than 10.0 seconds. In peak traffic periods of the day, when team sizes are large, this queuing interval would average about 2.0 seconds. In periods of lower traffic volume, when team sizes are smaller, it would typically average about 6.0 seconds, and (4) a playback interval, wherein the compressed directory assistance request is played for the operator. This playback interval would seconds, and would average around 3.0 seconds.

The operator begins to key the directory assistance request into the directory assistance data base as soon as the operator has heard enough information to permit the beginning of querying the database. For example, if the customer says "In Albany, the number for the governor's office," the operator would key in the city requested as soon as it was heard.

Note that if the call involves a long queuing delay the subscriber may hear silence or alternatively a prerecorded message during the time period from the end of the initial request interval to the end of the playback interval. During this interval the operator is not yet directly connected with the customer.

When the call is processed in accordance with the present invention, the operator time is reduced by about 25 percent of the length of the initial order, which on average would be 1.0 second, plus the duration of the operator greeting phrase, which is no longer spoken or heard by the operator. This would cause a further saving of about 1.0 second. Thus the total average saving in operator work time involved in listening to the customer's initial request for information would be about 2.0 seconds. Thus, the use of speech compression technology in connection with the processing of directory assistance calls result in a significant reduction in the operator average work time per call.

In the United States, telephone companies handle over six billion directory assistance calls per year. A one second per call decrease in average operator work time could free over one thousand directory assistance operators to provide other types of services.

It should be noted, that in addition to being applicable to directory assistance calls, the present invention is applicable in other service situations where call requests are handled by a pool of operators, attendants, or sales representatives, such as airline reservation systems and telephone sales or service systems wherein customers call to order particular products or services or to report trouble.

DETAILED DESCRIPTION OF THE INVENTION

Figure 1:
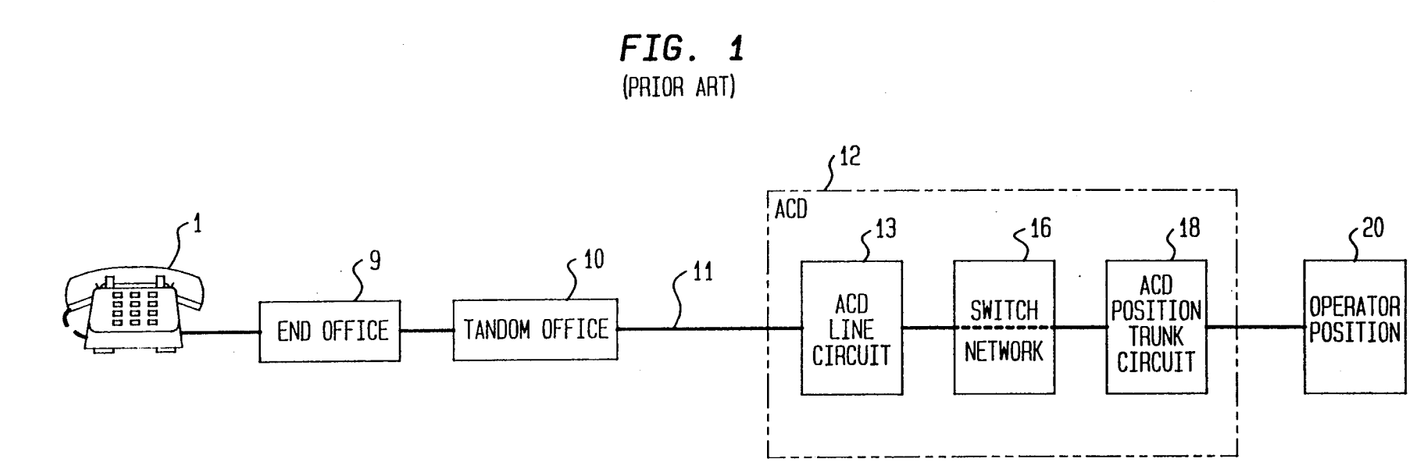
FIG. 1 schematically illustrates a conventional method for processing a directory assistance call.

The processing of a conventional directory assistance call is shown in FIG. 1. Typically, a subscriber 1 dials Directory Assistance (e.g. by dialing 411 or 555-1212) and is connected by the public telephone network through an end office 9 and a tandem office 10 to a directory assistance trunk 11 and to an automatic call distributor (ACD) 12.

Typically, the ACD 12 serves to terminate a plurality of directory assistance trunks, only one of which, i.e. the trunk 11, is illustrated in FIG. 1.

The ACD 12 is a type of switch which routes incoming directory assistance calls, arriving on the incoming directory assistance trunks, to the first available operator position out of a plurality of operator positions. Thus, in FIG. 1 the directory assistance trunk 11 is terminated by the ACD line circuit 13 and is connected by a switch network 16 to a position trunk circuit 18. The position trunk circuit 18 is connected to an operator position 20. As indicated above, a plurality of operator positions are connected to the ACD, of which only the operator position 20 and its associated trunk circuit 18 are illustrated in FIG. 1. If no operator position is available for a directory assistance call which arrives at the ACD 12, for example, via the directory assistance trunk 11, the call is queued at the ACD until an operator position is available. While the call is queued, a ringing signal is transmitted back via the switches 10 and 9 to the subscriber 1.

Figures 2, 4:
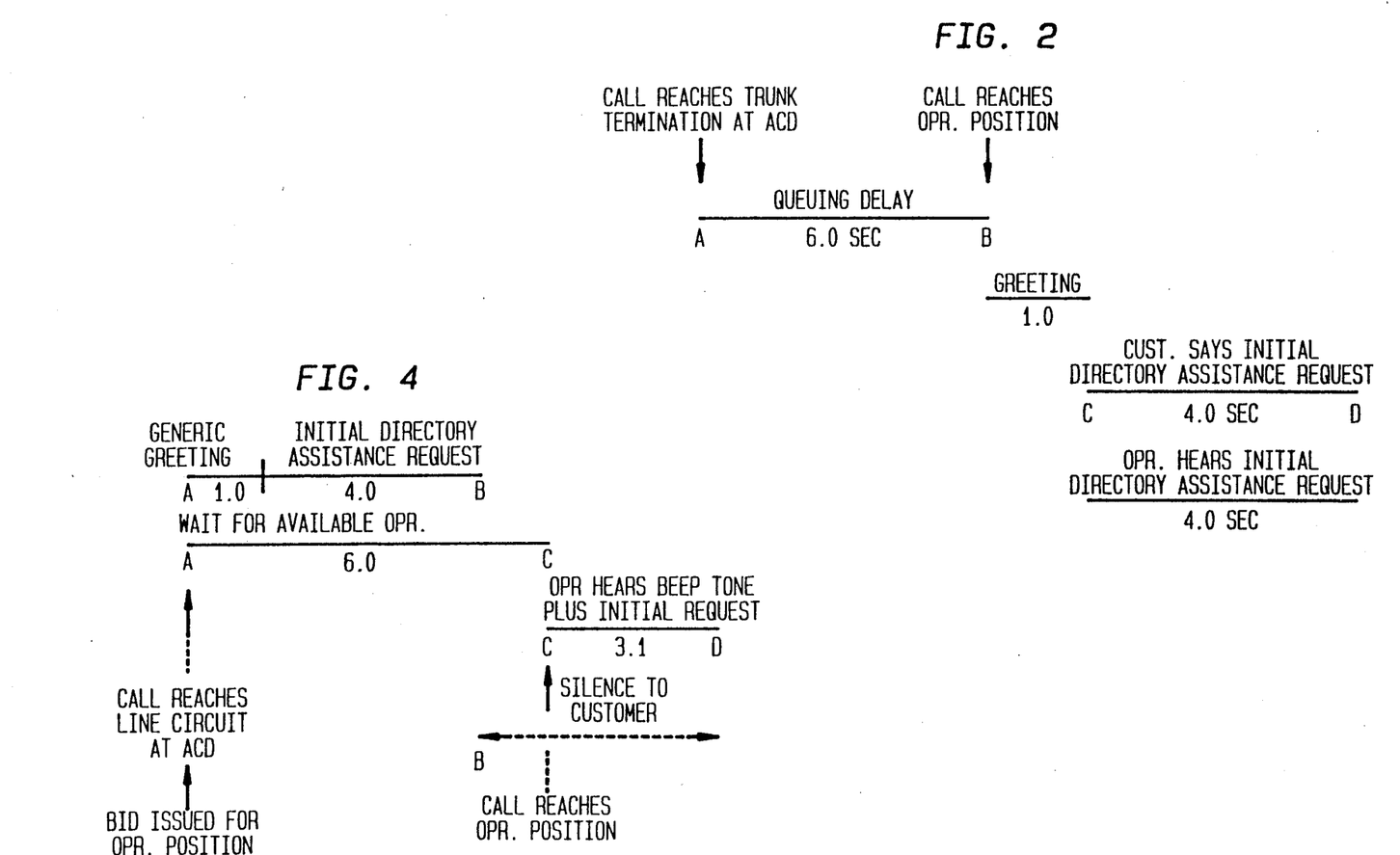
FIG. 2 is a time chart which shows typical time periods occupied by the various processing steps of the conventional directory assistance call processing method.
FIG. 4 is a time chart which shows the time periods occupied by the various processing steps of the directory assistance call processing method of FIGs 3A-3E.

The timechart of FIG. 2 illustrates the interaction between a subscriber (e.g. subscriber 1 of FIG. 1) and an operator (e.g., the operator at position 20 of FIG. 1) in a conventional directory assistance call.

At time a directory assistance call reaches a line circuit at an ACD. The call is queued to wait for an available operator position and at time B the call is connected to an operator position. During those hours of the day when traffic volumes are light, the time period between A and B typically averages about 6.0 seconds. After the directory assistance call reaches an operator position at point B, a recording which has been prerecorded by the operator automatically plays a greeting to the subscriber (e.g. "XYZ Bell, Joan"). The greeting typically lasts 1.0 seconds. From time C to time D the subscriber speaks the initial directory assistance request (e.g. "Ahhh, yes. In Morristown, the number for the City Hall."), which request is heard by the operator while it is being spoken. Typically, the time from C to D averages about 4.0 seconds.

After the operator hears the request, the operator uses the position keyboard to query the directory assistance data base. The operator selects the appropriate telephone number and telephone number transmits it to the subscriber. Note that in FIG. 2, the total time from A to D is 11.0 seconds and that an operator is involved from time B to time D which is 5.0 seconds.

In accordance with the present invention, this 5.0 second time period may be substantially reduced through the use of speech compression technology.

FIGS. 3A-3E illustrate sequentially the steps involved in the processing of a directory assistance call in accordance with an embodiment of the present invention. Thus, in individual ones of FIGS. 3A-3E, only the processing elements for carrying out particular steps are illustrated and none of FIGS. 3A-3E show all of the processing elements. In FIGS. 3A-3E, solid lines indicate the flow of voice signals and broken lines indicate the flow of control signals.

Figure 3A:
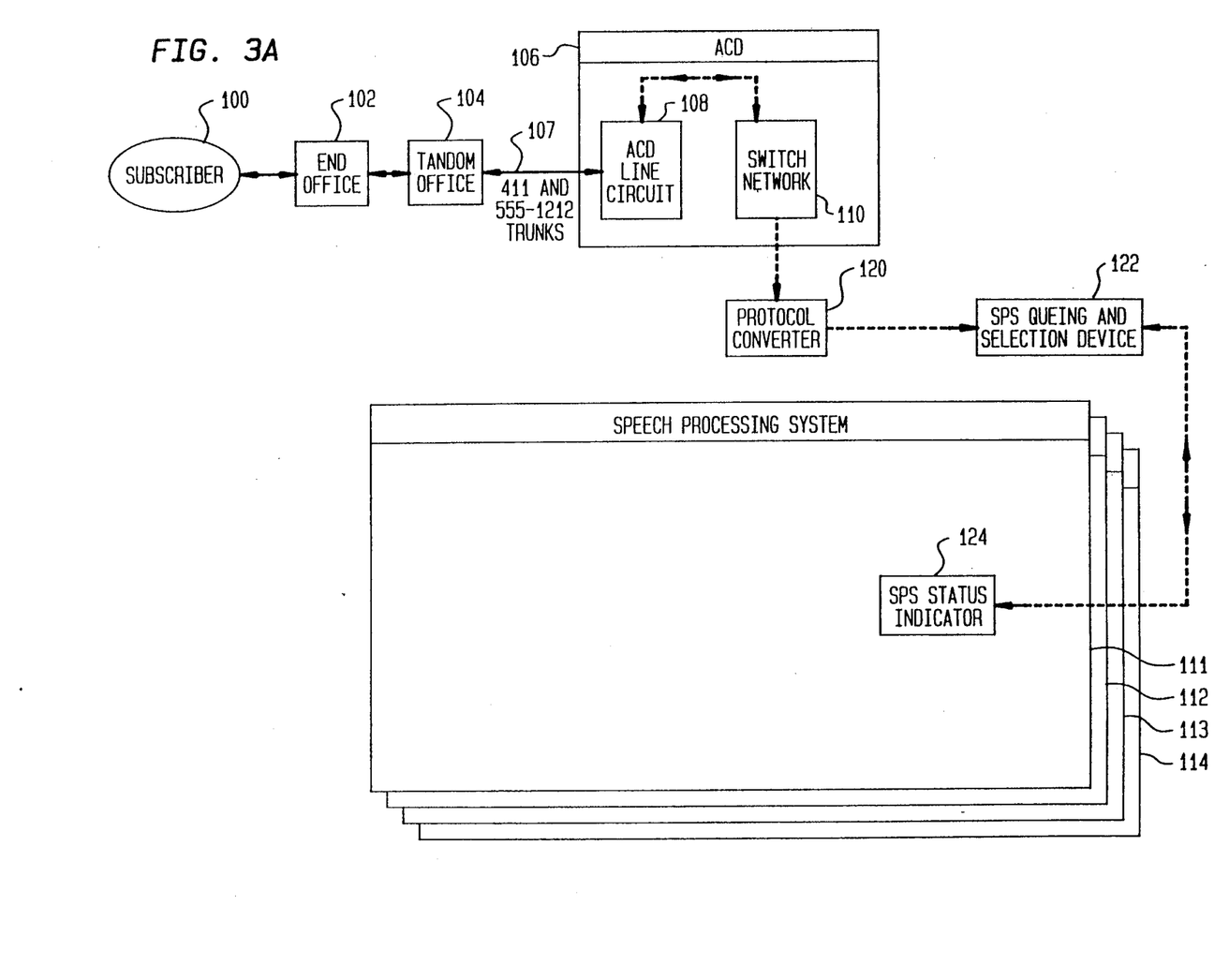
FIGS. 3A-3E show the processing of a directory assistance call using speech compression in accordance with an illustrative embodiment of the present invention.

Turning to FIG. 3A, a subscriber 100 can reach directory assistance by dialing 411 or 555-1212. The dialed digits are recognized by the end office 102 which serves the subscriber 100. The directory assistance call may be routed by the end office 102 over a trunk which goes directly to a directory assistance ACD 106 or, as shown in FIG. 3A, the directory assistance call may be routed to the ACD 106 via one or more intermediate offices such as the tandem office 104.

When the call reaches the ACD 106 via the directory assistance trunk 107, the call is connected to a line circuit 108 located in the ACD 106. As indicated above, there is one such line circuit associated with each directory assistance trunk reaching the ACD. When the directory assistance call reaches the line circuit 108, a control signal is transmitted to the ACD switch network 110.

The switch network 110 then initiates a bid for a speech processing system (SPS). Illustratively, there are a plurality of speech processing systems 111, 112, 113, 114 etc. associated with the ACD 106. To bid for a speech processing system, the switch network 110 transmits a signal through a protocol converter 120 to a speech processing system queuing and selection device 122. (Illustratively, if the ACD 106 is a digital ACD, all communications between the ACD and the queuing and selection device 122 and the speech processing systems 111, 112, 113, 114 are processed through the protocol converter. However, if the ACD 106 is electromechanical rather than digital, the protocol converter 120 may be omitted).

Each speech processing system 111, 112, 113, 114 includes a status indicator 124. The queuing and selection device 122 continuously polls the status indicators 124 to determine which of the many speech processing systems are busy or are free. In this manner the queuing and selection device 122 chooses an available speech processing system such as speech processing system 111 for the directory assistance call arriving at the ACD 100 on the trunk 107. If no speech processing system is free, the call is queued until one is available. However, it is preferred that there be a sufficient number of such speech processing systems associated with the ACD so that such queuing times are either non-existent or negligible.

After the queuing and selection device 122 chooses a desired speech processing system such as the speech processing system 111, a controller 130 (see FIG. 3B) forming part of the selected speech processing system 111 is notified.

Figure 3B:
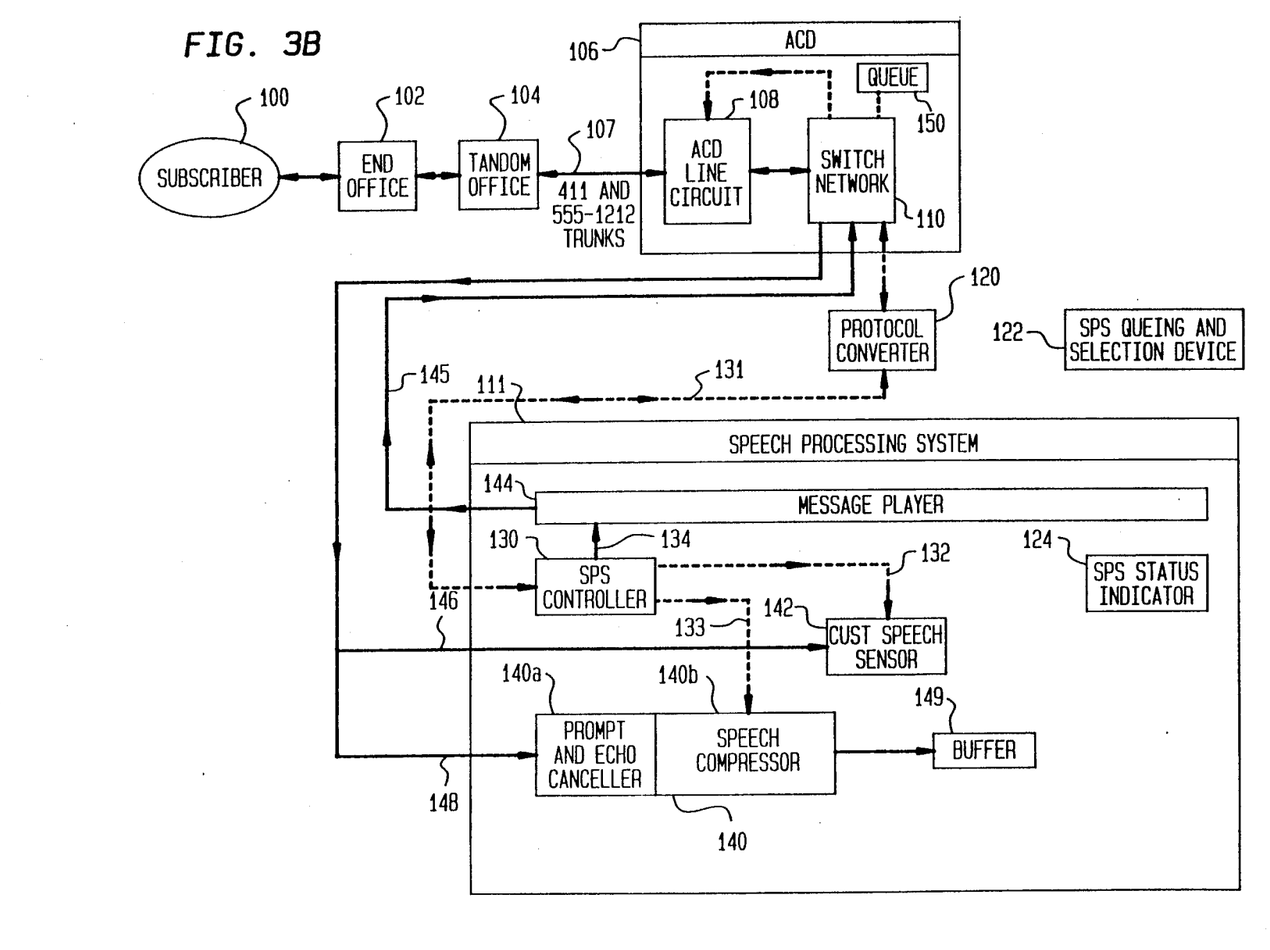

As shown in FIG. 3B, a control connection 131 is established between the controller 130 and the switch network 110 via the protocol converter 120, a control connection 132 is established between the controller 130 and a customer speech sensor 142, a control connection 133 is established between the controller 130 and a speech processor 140, and a control connection 134 is established between the controller 130 and a message player 144. As a result of the control connections 131, 132, 133, and 134 the directory assistance call arriving from the subscriber 100 is simultaneously connected to the message player 144 via voice connection 145, to the customer speech sensor 142 via voice connection 146, and to the speech processor 140 via the voice connection 148. The speech processor 140 comprises a prompt and echo canceller 140a and a speech compressor 140b.

As soon as the above-described connections are formed, the message player 144 plays a generic greeting to the subscriber 100 which generic greeting prompts the subscriber to speak an initial directory assistance request. As soon as the subscriber 100, begins speaking, the speech is received at the speech compressor 140b which then compresses the speech. If the subscriber starts speaking while the message player 144 is playing a message, the prompt and echo canceller 140a removes the message sounds before they reach the speech compressor 140b. The compressed speech produced by the speech compressor 140b is stored in the buffer 149. The speech compressor 140b analyzes the spectral content of a speech signal and detects the speed at which this spectral information changes. This information is utilized to determine the degree to which the speech signal can be compressed. Compression involves removing bits of redundant information. Alternatively, or in conjunction with speech compression, other speech processing techniques such as silence deletions or automatic speech recognition of particular words or phrases may be implemented by the processor 140 to speed up a subscriber's speech and reduce the time required by an operator to hear a subscriber's speech.

Simultaneously with the playing of the generic greeting message by the message player 144, the speech processing system 111 issues a bid for an operator position. The bid is issued by the controller 130 and is transmitted to the switch network 110 of the ACD 106. The bid is placed in a queue 150 until there is an available operator position for the particular speech processing system 111.

To summarize briefly, up to this point, a directory assistance call arriving at the ACD 106 via the trunk 107 is connected to a speech processing system 111. The speech processing system 111 prompts the subscriber making the directory assistance call to speak an initial directory assistance request, which request is compressed by the speech compressor 140b and stored in the buffer 149. Simultaneously, the speech processing system 111 has placed a bid for an operator position. If no operator position is available, the bid is queued in the queue 150 of the ACD 106 until an operator position is available.

The next stages of the directory assistance call involve connecting the speech processing system 111 to an available operator position so that an operator can hear the compressed initial directory assistance request, and then connecting the operator to the subscriber so that the subscriber can receive a response to the directory assistance request or have further interaction with the operator.

Before considering these stages of a directory assistance call, it is first useful to consider three contingencies which may occur for particular directory assistance calls.

The first contingency occurs when the subscriber hangs up without speaking. In the case where the subscriber hangs up, the line circuit 108 sends a signal to the switch network 110 which in turn informs the speech processing system controller 130. The speech processing system controller 130 disconnects the speech connections 145, 146, and 148 from the message player 144, the customer speech sensor 142, and the speech processor 140. In addition, the controller 130 disconnects itself from the ACD switch network 110 and removes the control connections 132, 133, and 134 to the speech sensor 142, speech processor 140, and message player 144. Furthermore, the speech processing system status indicator 124 informs the queuing and selection device 122 that the particular speech processing system 111 is now available.

When the ACD switch network 110 is notified that the subscriber has hung up, the switch network 110 removes the request for an operator position from the queue 150. In addition, the trunk 107 is released.

The second contingency occurs when two conditions are present in combination—first, the subscriber remains on the line but does not speak within 1.0 second, and second, after a subsequent prompting message is played there is no customer speech within a predetermined interval. If there is no speech for 1.0 second after the end of the greeting message, the customer speech sensor 142 detects this fact and provides this information to the controller 130. The controller 130 causes the message player 144 to play a prompting message such as "Directory Assistance, how can I help you?" to the subscriber 100. If there is no speech within a predetermined interval from the end of the prompting message the call is disconnected. If the subscriber 100 speaks during the prompting message, the prompt and echo canceller 140a removes the sounds of the prompting message from the sounds that reach the speech compressor 140b.

The third contingency occurs when three conditions are present in combination—first, the customer starts speaking within 1.0 second of the end of the initial greeting message, second, the customer's speech lasts less than some predetermined duration, for example, 1.0 second, and third, after a subsequent prompting message is played there is no customer speech within a predetermined interval. This condition indicates that insufficient information was given for the operator to conduct a database search. If the subscriber starts speaking within 1 second of the end of the initial greeting message, the controller 130 uses information provided by the speech sensor 142 to determine if the subscriber's speech was less than a predetermined duration such as 1 sec. If the subscriber's initial speech was less than 1 second (e.g. "In Morristown."), the controller 130 determines if the initial speech was followed by a silent interval of predetermined duration such as 1.5 seconds. If there was such a silent interval, the controller 130 causes the message player to play a continuation prompt such as "Yes. Go ahead." If the subscriber 100 speaks during the continuation prompt (e.g. "The number for the City Hall."), the prompt and echo canceller 140a removes the sounds of the message from the sounds that reach the speech compressor 140b.

If no speech is received for a predetermined interval such as 1.5 second from the end of the continuation prompt message, the controller 130 sends a message to the switch network 110 of the ACD 106, instructing the switch network 110 to disconnect the call. To disconnect the call, the controller 130 disconnects the call from the message player 144, the customer speech sensor 142, and the speech processor 140. In addition, the controller 130 disconnects itself from the ACD switch network 110 as well as the message player 144, speech sensor 142 and speech processor 140. When the ACD switch network 110 is notified to disconnect the call, the switch network 110 removes the request for an operator position from the queue 150 and causes the ACD line circuit 108 to release the trunk 107.

Thus, in the foregoing manner a directory assistance call is processed under three contingencies:

(a) when the subscriber hangs up without speaking, or (b) when the following two conditions are present in combination—first, the subscriber remains on the line but does not speak a directory assistance request within 1.0 second, and second, after a subsequent prompting message is played there is no customer speech within a predetermined interval, or (c) when the following three conditions are present in combination—first, the customer starts speaking within 1.0 second of the end of the greeting message, second, the customer's speech lasts less than some predetermined duration, for example, 1.0 second, and third, after a subsequent prompting message is played there is no customer speech within a predetermined interval.

The case is now considered wherein the subscriber does speak a directory assistance request longer than one second in response to an initial greeting message or responds to a further prompt from the message player 144. The presence of a directory assistance request is assumed to be indicated by subscriber speech which is longer than a predetermined duration such as 1 second. When subscriber speech of longer than 1 second is detected by the speech sensor 142 and the controller 130, which speech is followed by a silent period of a duration such as 2 seconds (to make sure the customer is finished speaking), the message player 144 will play a message to the subscriber such as "Thank you, please hold on. An operator will process your call." At this point the subscriber 100 waits for the call to be connected to an available operator position. If the call is connected to an available operator position while the message is being played, the message will be interrupted.

In the case where the subscriber 100 speaks a directory assistance request, the speech processing system controller 130 measures the interval from when the subscriber stops speaking to determine if an operator position is connected to the call within an interval such as 5 seconds. If not, the message player 144 will play a message for the customer such as "Please hold on. The operator will be with you shortly." If an operator is connected to the call during this message, the message will be interrupted.

Figure 3C:
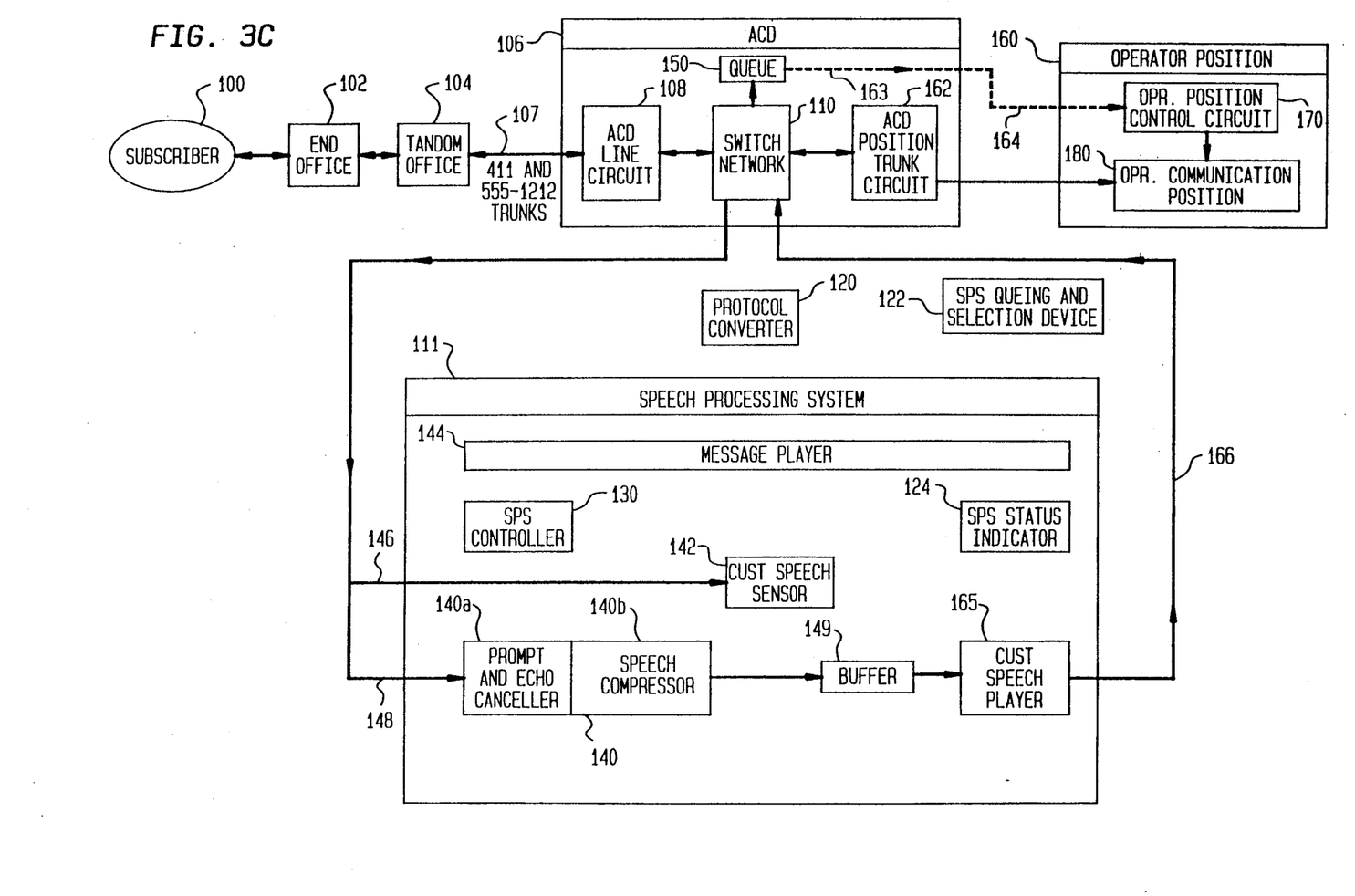

The mechanism by which an operator position is connected to the directory assistance call is considered in connection with FIG. 3C.

A plurality of operator positions are associated with the ACD 106. One such operator position 160 is shown in FIG. 3C. The operator position 160 comprises control circuit 170 and the operator communications position 180 which is operated by a directory assistance operator. Each operator position such as position 160 is connected to the ACD by a position trunk circuit such as the position trunk circuit 162.

The ACD 106 recognizes via connection 164, which extends between the switch network 110 and the operator position control circuit 170 of the operator position 160, that the operator position 160 has become available. The queue 150 is then checked to determine which speech processing system (e.g. 111, 112, 113, 114 of FIG. 3A) has been waiting the longest since it issued a bid for an operator. Illustratively, the speech processing system 111 has been waiting the longest so that it is connected to the operator position 160. More particularly, as shown in FIG. 3C a customer speech player 165 in the speech processing system 111 is connected by connection 166 and by the ACD switch network 110 and position trunk circuit 162 to the operator communication position 180 of the operator position 160. The customer speech player 165 then begins playing the compressed initial directory assistance request stored in the buffer 149, which compressed request is then heard by the operator working at the operator position 160. If the subscriber 100 says anything more while the operator is listening to what is already contained in the buffer 149, this new speech will be compressed by the speech compressor 140b and then transmitted through the buffer 149 and customer speech player 165 to the operator. When the operator hears the initial directory assistance request, the operator keys this request into a directory assistance data base to obtain the requested telephone number.

Illustratively, at this point, a connection is established between the operator position 160 and the subscriber 100 so that the requested telephone number can be transmitted to the customer.

Figure 3D:
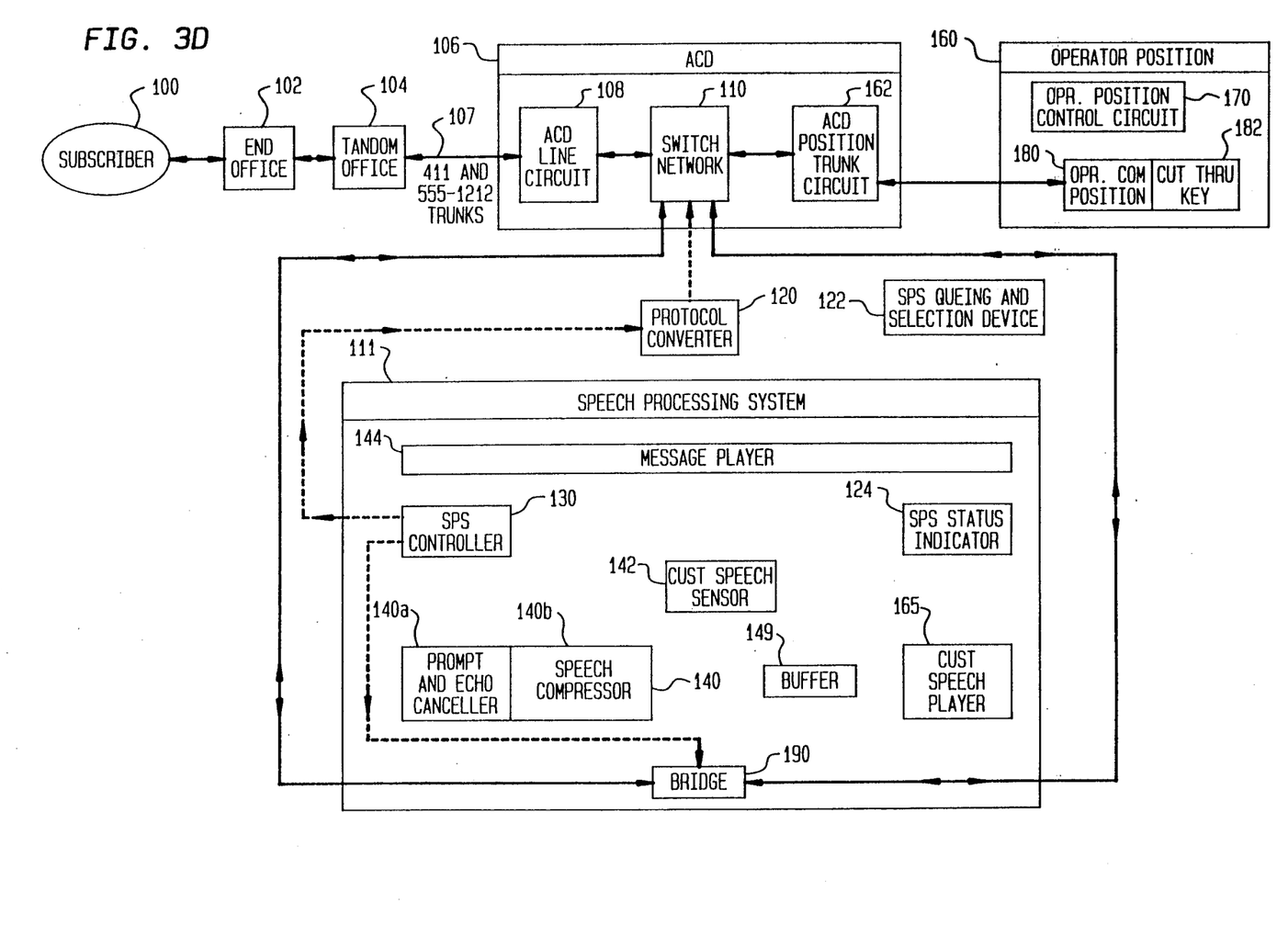

As shown in FIG. 3D, the operator position 160 includes a cut-through key 182. When the operator depresses the cut-through key 182 or when all the speech stored in the buffer 149 has been played for the operator, the speech processing system controller 130 activates the bridge 190 which is located in the speech processing system 111 to establish a talking connection between the operator at position 160 and the subscriber 100. This talking connection goes from the operator communications position 180, to the ACD position trunk circuit 162, to the switch network 110, to the bridge 190, to the switch network 110, to the ACD line circuit 108 and via the trunk 107, to the switches 104 and 102 and finally to the subscriber 100. When this talking connection is established, an operator answer supervision signal is transmitted to the end office 102 to activate an automatic billing system associated with the end office 102 for billing the directory assistance call. The operator can hear uninterrupted voice signals during the transition from compressed to uncompressed customer speech. If the customer is speaking at the time, the operator immediately begins hearing the customer in real time as the customer is speaking. A symbol appears on the video screen of the operator position to notify the operator that the operator and the customer are now connected to the same telephone circuit. The operator can now speak to and be heard by the customer. If the message player 144 is playing a message at the time the cut-through key is pressed, the controller 130 causes the message to be interrupted. In addition the connections (see FIGS. 3B and 3D) to the message player 144, speech sensor 142, prompt and echo canceller and speech compressor 140, the buffer 149, and customer speech player 165 are released.

When the connection between the operator position 160 and the subscriber 100 via the bridge 190 is established, the speech processing system controller 130 notifies the ACD 106 via the protocol converter 120 to establish a talking path through the ACD between the operator position 160 and the customer 100. The establishment of this talking path through the ACD 106 is not noticeable for the operator-customer interaction.

The operator position 160 and the subscriber 100 are initially connected directly via the speech processing system 111 and its bridge 190. Subsequently the subscriber 100 and operator position 160 are connected directly via the switch network 110. The reason for initially using bridge 190 to establish this direct connection is to assure that the operator can hear uninterrupted voice signals during the transition from compressed to uncompressed customer speech. If bridge 190 were not used as an interim connection, the time needed for establishing the connection between the subscriber 100 and the operator position 160 through the switch network 110 may not be brief enough to permit the operator to hear uninterrupted voice signals.

Figure 3E:
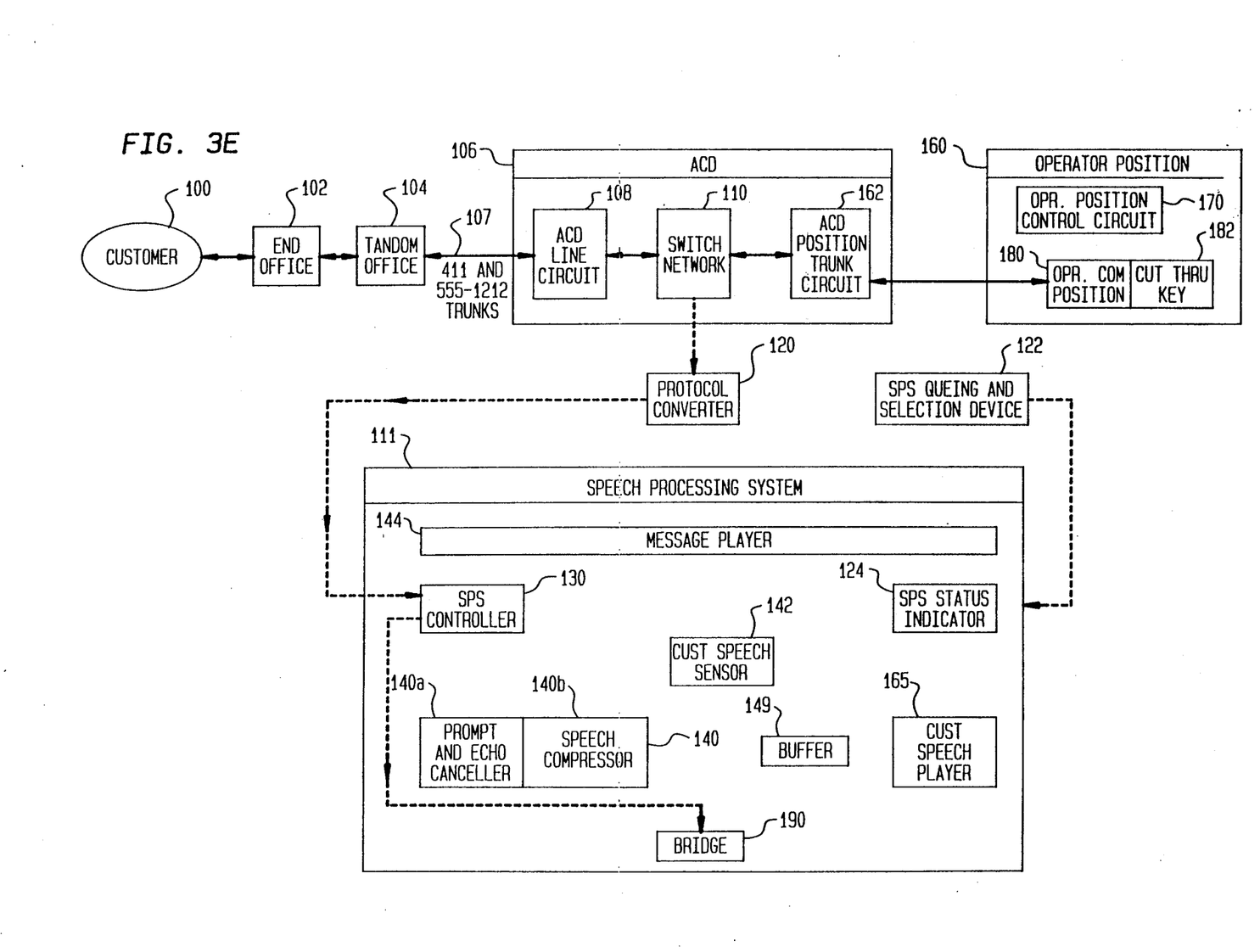

FIG. 3E shows the connection going through the ACD 106 between the operator position 160 and the customer 100. This connection includes the ACD position trunk circuit 162, the switch network 110, the ACD line circuit 108, and the offices 104 and 102.

When the connection through the ACD 106 is setup, the ACD 106 notifies the controller 130 of the speech processing system 111 via the protocol converter 120. The controller 130 then releases the bridge 190. In addition, the status indicator 124 informs the queuing and selection device 122 that the speech processing system 111 is available for another call.

The remainder of the directory assistance call is processed in a conventional manner using the ACD 106.

The inventive directory assistance call processing method is summarized in FIG. 4 which is a timechart of a portion of a directory assistance call. As shown in FIG. 4, an illustrative directory assistance call reaches the line circuit of an ACD at time A and is connected to a speech processing system. A generic greeting which lasts about 1 sec is played for the subscriber who made the call, which greeting is followed by the speaking of an initial directory assistance request. Typically the speaking of the initial request lasts about 4.0 seconds and ends at time B.

At about time A, a bid is issued by the speech processing system for an operator position and it takes about 6.0 seconds for the bid to be satisfied. Thus the call is connected to an operator position at time C. The operator hears the initial directory assistance request as compressed by the speech processing system. This compressed initial order may be preceded by a beep tone to alert the operator. The beep tone plus compressed initial order last 3.1 seconds and end at time D.

It should be noted that the customer hears silence or alternatively a recorded message from time B to time D. After hearing the compressed initial request order, the operator keys in the request in the conventional manner.

By comparing FIG. 2 which illustrates the conventional directory assistance call processing method with FIG. 4, it can easily be seen that the present invention significantly reduces operator working time on those directory assistance calls in which compression takes place. Thus in FIG. 2 the operator working time is 5.0 seconds while in FIG. 4 the operator working time is 3.1 seconds. It should be noted that a significant advantage of the present invention is that it can be implemented using presently installed ACD equipment and only the speech processing systems need be added to the presently installed equipment.

Finally, the above-described embodiments of the invention are intended to be illustrative only. Numerous alternative embodiments may be devised by those skilled in the art without departing from the spirit and scope of the following claims.

What is claimed is:

1. A method for processing a directory assistance call comprising the steps of
    receiving a call from a subscriber at an automatic call distributor via an incoming trunk,
    utilizing said automatic call distributor to connect said call to a speech processing system,
    receiving at said speech processing system an initial request for a telephone listing spoken by said subscriber and processing said initial request to shorten the time it takes for an operator to hear the initial request, and
    connecting said speech processing system via said automatic call distributor to a specific operator out of a plurality of operators and playing for said specific operator said initial request as processed by said speech processing system.

2. The method of claim 1 wherein said method further comprises:
    after said call is connected to said speech processing system, placing a bid by said speech processing system via said automatic call distributor for an operator out of said plurality of available operators, and queuing said bid until said specific operator is available.

3. The method of claim 1 wherein after said call is connected to said speech processing system a generic greeting is played for said subscriber.

4. The method of claim 1 wherein after said specific operator receives said shortened initial request, a communication path is established between said specific operator and said subscriber.

5. The method of claim 1 wherein said processing step comprises spectrally analyzing the speech signal comprising the initial request, deleting brief periods of silence, determining the rate of change of the speech signal spectrum and eliminating redundant information, and automatically recognizing particular words or phrases in said initial request.

6. The method of claim 1 wherein said processing step comprises compressing said initial request.

7. A method for processing calls comprising the steps of:
    receiving each of said calls at a speech processing system before connecting each of said calls to a specific operator out of a plurality of operators,
    processing at said speech processing system an initial request of each of said calls to shorten the time required by an operator to hear the initial request, and
    transmitting the shortened initial request formed as a result of said processing step for each of said calls to a specific one of said operators.

8. The method of claim 7 wherein said method further comprises
    after each call is connected to a specific operator, connecting said specific operator to the subscriber initiating the call.

9. A method for processing service calls to be routed to an available operator out of a plurality of operators to reduce the average operator working time on each of said service calls, said method comprising the steps of:
    receiving each of said service calls at a speech processing system before connecting each of said service calls to a specific one of said operators,
    compressing at said speech processing system an initial service request forming part of each of said service calls, and
    transmitting a compressed initial service request formed as a result of said compressing step for each of said service calls to a specific one of said operators.

10. A device for processing service calls transmitted by a telephone network comprising,
    speech processing means including means for shortening speech, and
    call distribution means in communication with said speech processing means and including means for receiving said service calls from said telephone network, means for connecting said service calls to said speech processing means so that said shortening means can shorten spoken initial service requests contained in said calls, and means for connecting said speech processing means to a specific operator position out of a plurality of operator positions for each of said calls so that an operator can hear each of said initial service requests as shortened by said shortening means.

11. The device of claim 10 wherein said shortening means comprises means for compressing speech.

* * * * *